May 6, 1958   J. W. CARPENTER   2,833,380
SHOCK ABSORBER
Filed April 14, 1955

INVENTOR.
JAMES W. CARPENTER
BY
ATTORNEY

# United States Patent Office 2,833,380
Patented May 6, 1958

2,833,380
SHOCK ABSORBER

James W. Carpenter, Cleveland Heights, Ohio, assignor to The Cleveland Pneumatic Tool Company, Cleveland, Ohio, a corporation of Ohio Application April 14, 1955, Serial No. 501,396

1 Claim. (Cl. 188—96)

This invention relates to shock absorbers in general and more particularly to a new and improved simplified shock absorber structure.

It is an important object of this invention to provide a simple shock absorbing mechanism which does not require periodic servicing when it is stored for long periods of time.

It is another important object of this invention to provide a shock absorber mechanism providing a flexible diaphragm which prevents moisture and air from entering the liquid chambers when the mechanism is not in use.

It is still another object of this invention to provide a hydraulic shock absorber having a frangible diaphragm for retaining the liquid within the shock absorber mechanism prior to the operation thereof.

It is still another object of this invention to provide a shock absorber mechanism having a variable volume liquid filled cavity separated into first and second chambers by an orifice member, wherein one of the chambers is defined in part by a flexible member.

Further objects and advantages will appear from the following description and drawings, wherein.

Figure 1:
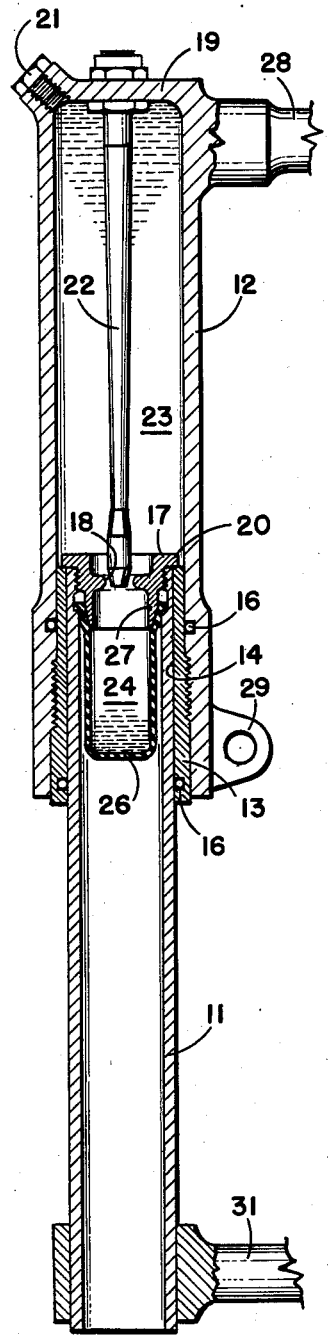
Figure 1 is a side elevation in longitudinal section of the preferred form of this invention shown in its extended position prior to operation.

For a clear understanding of this invention, reference should be made to the drawings wherein the shock absorber mechanism provides inner and outer telescoping members 11 and 12 respectively, capable of relative axial motion. A gland nut 13 is threaded into the outer end of the outer telescoping member 12 and provides a bearing surface 14 along which the outer surface of the inner telescoping member 11 slides. Seals 16 prevent leakage between the telescoping members 11 and 12 and the gland nut 13. The outer telescoping member 12 is formed with a mounting boss 28 and mounting bracket 29 which may be utilized to mount the shock absorber in the apparatus to which it is attached. A second mounting boss 31 secured to the inner telescoping member 11 provides means for mounting this member to the associated equipment.

An orifice member 17, provided with a central orifice 18, is threaded into the inner end of the inner telescoping member 11. A flange 20 on the orifice member 17 engages the gland nut 13 and limits the extension of the device. A bulkhead 19 closes the end of the outer telescoping member 12 and a charging fitting 21 is provided so that hydraulic fluid may be introduced into the shock absorber. A contoured metering pin 22 mounted on the bulkhead 19 extends through the orifice 18 to throttle liquid flow through the orifice to produce the desired load stroke relationship for the shock absorber mechanism. The orifice member 17 and the outer telescoping member 12 cooperate to define a chamber 23 and the orifice member 17 and a bag-like flexible rubber member 26 cooperate to define a second chamber 24 on the other side of the orifice. The orifice member 17 is provided with an axial extending skirt portion 27 which projects into the open end of the flexible member 26 and radially presses it against the inner wall of the inner telescoping member 11 to provide a fluid seal therewith. Both the chambers 23 and 24 are filled with hydraulic fluid when the telescoping members are in the extended position shown in Figure 1.

This shock absorber is primarily designed for use in installations wherein the shock absorber will only operate once, such as in escape mechanisms or other types of emergency devices. However, it is of utmost importance in such uses that the mechanism be in good operating condition even though it may not be inspected or serviced for long periods of time. By providing the flexible bag-like member 26 to confine a portion of the liquid contained in the shock absorber, expansion and contraction of the liquid due to the temperature changes will merely cause stretching and flexing of the flexible member 26. The flexible member 26 thereby maintains the pressure of the hydraulic fluid contained within the shock absorber substantially equal to the atmospheric pressure except when the shock absorber mechanism operates, so there will be no tendency for foreign matter to penetrate into the liquid chambers nor will there be any tendency for liquid to leak out of the chambers.

Figure 2:
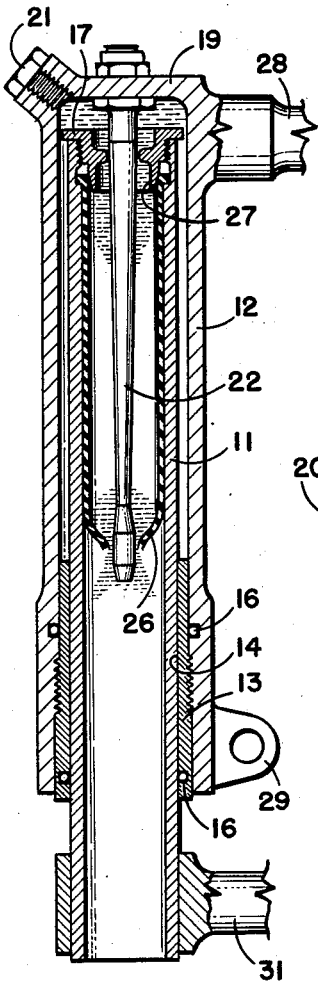
Figure 2 is a side elevation in longitudinal section showing the operation of the shock absorber according to this invention; and, Figure 3 is an enlarged fragmentary longitudinal section showing the structural detail of the resilient member and its mounting within the shock absorber.
Figure 3:
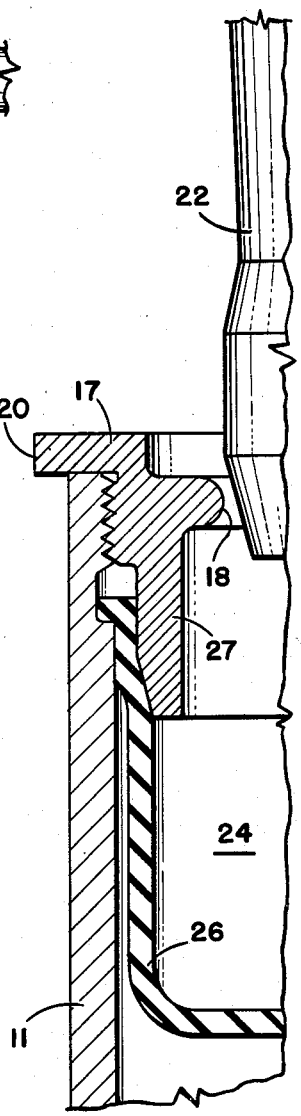

In operation, an axial load is applied to the inner telescoping member 11 tending to urge it axially toward the outer telescoping member 12. This produces relative axial motion between the telescoping members 11 and 12 which reduces the volume of the chamber 23 and causes a build-up of pressure therein. This forces hydraulic fluid to flow through the orifice around the metering pin 22 and into the chamber 24 which flow causes the flexible member 26 to stretch. At the same time the metering pin 22 moves into the chamber 24 and engages the flexible member and causes it to break (as shown in Figure 2). In shock absorbers which do not include a metering pin the liquid flowing into the chamber 24 causes the flexible member to stretch until it reaches the bursting point at which time a rupture will occur. This prevents a build-up of pressure in the chamber 24 which would tend to cause a rebound of the shock absorber mechanism at the end of its stroke. Since the preferred shock absorber mechanism is a single operation device, the outer end of the inner telescoping member 11 is open so that the hydraulic fluid may escape after the mechanism has operated. Also since the chambers 23 and 24 are both completely filled with liquid the shock absorber may be stored or operated in any position.

Although a preferred embodiment of this invention is illustrated, it will be realized that various modifications of the structural details may be made without departing from the mode of operation and the essence of the invention. Therefore, except insofar as they are claimed in the appended claim, structural details may be varied widely without modifying the mode of operation. Accordingly, the appended claim and not the aforesaid detailed description are determinative of the scope of the invention.

I claim:

A shock absorber comprising a first cylindrical member formed with a bulkhead closing one end thereof, a second cylindrical member with its inner end projecting into the other end of said first member, said members being capable of relative axial motion, an element on said second member formed with an orifice, and a bagshaped flexible diaphragm closing said second member on the side of said element remote from said inner end, a first liquid filled chamber defined by said first member in fluid communication through said orifice with a second liquid filled chamber defined by said diaphragm, and a metering pin mounted on said first member regulating the flow of said liquid through said orifice, said members being subjected to forces effecting said axial motion of said members toward each other and causing said metering pin to project into said second chamber to engage, stretch and break said diaphragm to provide fluid escape means from said second chamber and prevent rebound of said members axially away from each other upon removal of said forces.

References Cited in the file of this patent

UNITED STATES PATENTS

| | | |
|---|---|---|
| 1,909,768 | Jones | May 16, 1933 |
| 2,069,791 | Wallace | Feb. 9, 1937 |
| 2,213,823 | Renfer | Sept. 3, 1940 |
| 2,367,977 | Thornhill | Jan. 23, 1945 |

FOREIGN PATENTS

| | | |
|---|---|---|
| 523,726 | Belgium | Nov. 14, 1953 |
| 671,712 | Great Britain | May 7, 1952 |
| 1,004,261 | France | Nov. 28, 1951 |